July 16, 1957 W. H. HARDING 2,799,192
TIRE CHAIN REPAIRING DEVICE
Filed Dec. 10, 1954 2 Sheets-Sheet 1
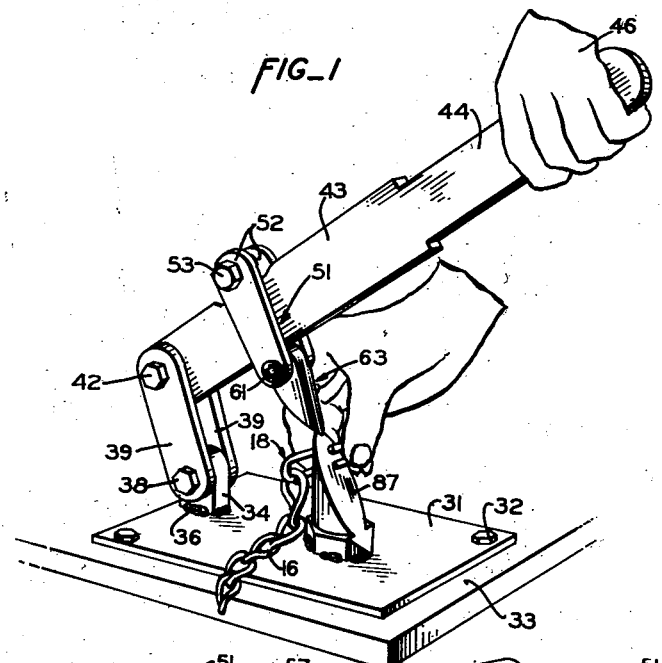
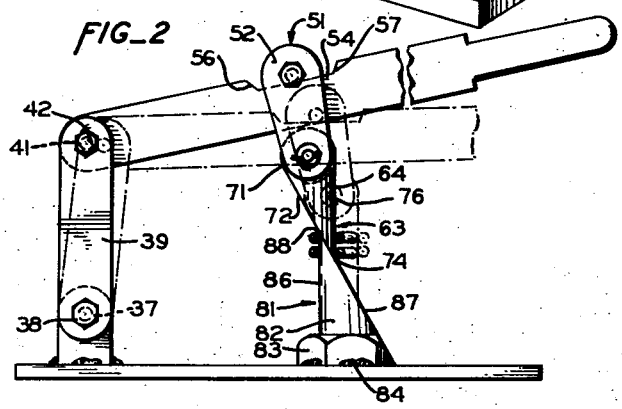
INVENTOR.
WILLIAM H. HARDING
BY
ATTORNEY July 16, 1957  W. H. HARDING  2,799,192
TIRE CHAIN REPAIRING DEVICE
Filed Dec. 10, 1954  2 Sheets-Sheet 2
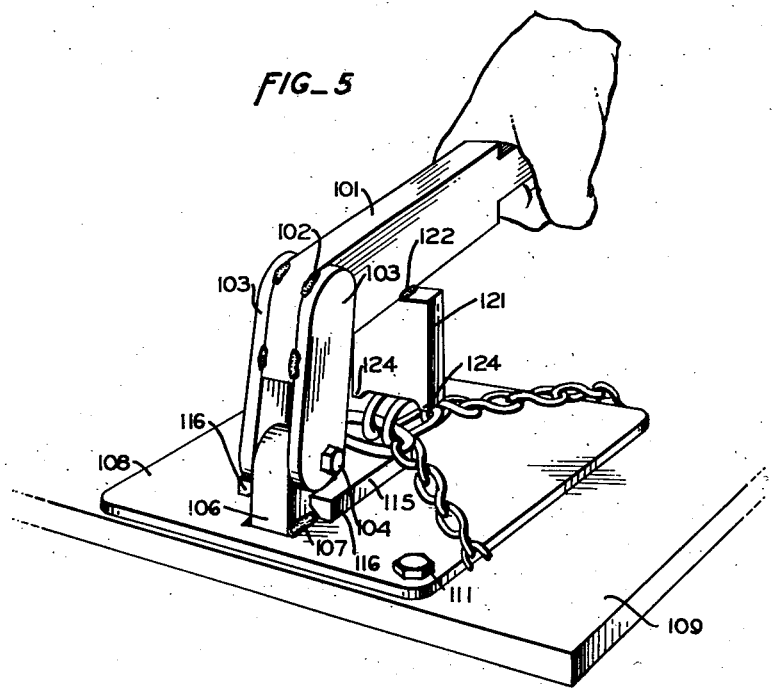
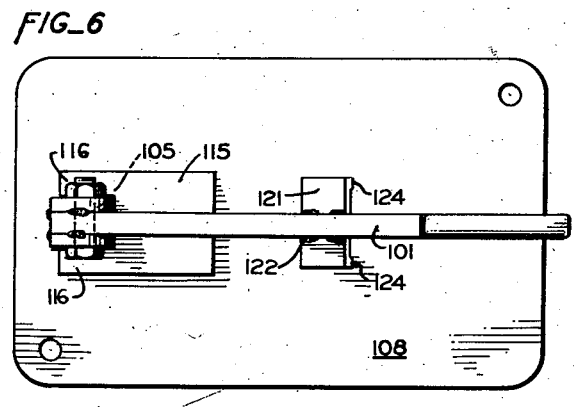
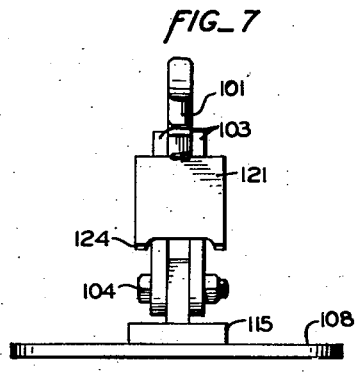
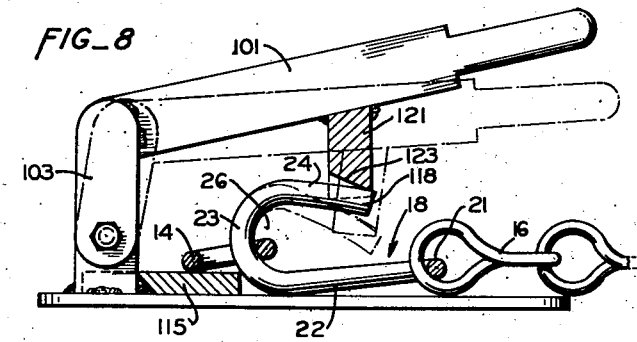
INVENTOR.
WILLIAM H. HARDING
BY
ATTORNEY

United States Patent Office 2,799,192
Patented July 16, 1957

2,799,192

TIRE CHAIN REPAIRING DEVICE

William H. Harding, West Sacramento, Calif.

Application December 10, 1954, Serial No. 474,553

3 Claims. (Cl. 81—15)

The invention relates to improved mechanism for replacing cross links in motor vehicle tire chains.

Tire chains, and especially the transverse links crossing the tire tread, become worn in time and can eventually break if use is continued. To save costs, tire chain users, particularly users such as truck fleet operators effect repair by replacing the worn cross links with new ones. A number of devices have been used in the past to replace the cross chain links, but prior devices have either required two men to handle them, or necessitate several tries in order to effect opening of the link; and in closing the links, a number of the previously used devices have caused injuries to the repairing personnel by displacing or suddenly kicking the link sideways against the hands or arms.

It is therefore an object of the invention to provide a tire chain repairing device which can be safely utilized and by only one person.

It is another object of the invention to provide a tire chain repairing device which is not only durable and rugged but is inexpensive to own and operate.

It is a still further object of the invention to provide a tire chain device which is capable not only of quick opening of tire links, but also of rapid closure thereof, with the consequent advantage of rapidity of tire chain repair and reduced labor costs.

It is yet another object of the invention to provide a tire chain repairing device which takes but little space and which can be mounted in a convenient location such as on a bench.

It is a still further object of the invention to provide a tire chain repairing device which is usable, not only by motor vehicle operating and repair centers, such as garages and corporation yards, but which is also usable by individual car owners and drivers.

It is a still further object of the invention to provide a generally improved tire chain repairing device.

Other objects, together with the foregoing, are attained in the embodiment of the invention described in the following description and shown in the accompanying drawings, in which:

Figure 1 is a perspective of the device, and especially illustrating the use of the device in opening a tire chain link.

Figure 2 is a side elevation of the device shown in Figure 1.

Figure 3 is an end view thereof.

Figure 4 illustrates a segment of a motor vehicle wheel and tire showing a portion of a typical tire chain installation.

Figure 5 is a perspective view of the device, and especially illustrating its use as a tire chain link closer.

Figure 6 is a plan view of the device illustrated in Figure 5.

Figure 7 is an end view of the device illustrated in Figure 5.

Figure 8 is an elevation of the device illustrated in Figure 5 and showing a section of tire chain being closed by use of the device.

The tire chain repairing device of my invention is susceptible of numerous physical embodiments depending upon the particular environmental situation facing the user, but a number of the devices herein described and shown have been made and used with eminent success.

A typical tire chain installation is shown in Figure 4, the installation comprising a peripheral chain 11, or side chain, disposed on each side wall of a motor vehicle tire 12 mounted on a wheel 13 and having suitable side chain couplings, not shown. At the regular intervals on each side chain, an enlarged side chain link 14 is located, the enlarged link 14 being utilized as a holding or securing member for a cross chain 16 passing transversely over the tread 17 of the tire from one side chain 11 to the other. The terminal or base link at each end of the cross chain 16 is termed a cross chain connecting link and is designated by reference numeral 18.

The cross chain connecting link 18 comprises a U-shaped portion 21, as appears most clearly in Figure 3, in interlocking engagement with the adjacent link of the cross chain 16. Each of the legs of the U-shaped portion is extended to form a shank 22, recurved through an arcuate portion 23, or knuckle, and terminating in a closure leg 24, or hook portion. With especial reference to Figure 8, the closure portions 24 of the cross chain connecting link 18 are curved or bent inwardly toward the shank 22 and in this fashion serve to confine within an eye 26 formed by the arcuate portion 23 the enlarged side chain link 14, prohibiting separation between the cross chain connecting link 18 and the side chain link 14, and as appears most clearly in the position of the hook 24 shown in outline in Figure 8.

When it is desired to repair a tire chain by replacing the various worn cross chain links 16, the tire chain is unfastened or uncoupled from the tire in the customary fashion and carried to the tire chain repairing device, for example, the device illustrated in Figure 1. As a matter of convenience, all worn cross chains are removed before the new cross chains are inserted, removal of the cross chains being effected by spreading apart from each other the hook 24 and shank 22 portions of the link 18 and unhooking the link 18 from the link 14. The link opening mechanism of the tire chain repairing device of my invention comprises a base plate 31 mounted by suitable fastenings 32 on a surface 33 such as a bench top. While appropriately dimensioned levers of any of the three classes would be effective to transmit and increase force to be applied to the link elements a lever of the second class and illustrated in Figure 1 has been found to be eminently satisfactory since it gives the operator full vision of the inserting and opening operation and permits the operator to assume a comfortable position while applying force. At one end of the base plate, is mounted a stud 34, fastened to the plate as by weldments 36, the stud having formed therein a transverse horizontal opening 37 to receive a through bolt 38 serving as a pivot for a pair of link members 39 projecting upwardly and having formed adjacent their upper ends a pair of registering apertures 41 in which is placed a through bolt 42 serving as a pivot for a lever arm 43, the lever arm terminating on its end adjacent the operator in a conveniently formed handle 44 grasped by the hand 46 of the operator for downward application of force.

Tire chains are subjected in use to numerous and various types of shock and wear, as for example scraping and bumping against curbings, and, as a consequence, the various link members and particularly the cross chain connecting link members 18, are twisted or deformed into various shapes, the two hooks 24 frequently assuming dissimilarly bent attitudes. It is therefore necessary that the operator be able to insert the spreading elements of the device between the hooks 24 and shanks 22 at different directions. Variation in entrant attitude is permitted by the provision of a linkage 51 having freedom of motion in two directions. The linkage 51 comprises a pair of link members 52 disposed on each side of the lever 43 and joined together adjacent their upper ends by a through bolt 53, the through bolt 53 being supported on a depressed track 54 formed on the top side of the lever 43 intermediate the ends and is translatable along the track between a lower boundary wall 56 and an upper boundary wall 57 so as to permit adjustment of the linkage longitudinally. The links 52 extend downwardly along the vertical sides of the lever arm and project downwardly below the bottom of the arm and at their lower ends are connected by a cross bolt 61.

It can therefore be seen that the link pair 52 is not only slidable, within limits, longitudinally of the lever arm, but is also swingable about a horizontal transverse axis, coaxial with the axis of the through bolt 53. This freedom of motion permits the operator to place the links 52 in whatever position is most convenient to effect the opening of the cross chain connecting link. Since the links 52 rather closely confine the vertical sides of the lever arm 43, however, the links are prohibited from swinging in a lateral direction and the force exerted by the lever arm is, therefore, directed downwardly at all times.

The opening force exerted by the operator is transmitted to the link elements by an upper wedge 63, comprising a short right circular cylinder 64 having a pair of shoulders 65 formed therein adjacent its upper end, the shoulders being arcuate in elevation, as appears in Figure 2, and contoured to fit closely around the arcuate lower end of the links 52 so as to take the downward thrust exerted by the links 52 substantially equally regardless of the position of the upper wedge 63. Projecting upwardly from between the shoulders 65 is a boss 66, pivotally mounted on the cross bolt 61, the boss thus being capable of absorbing at least some of the downward force exerted by the links 52 and the cross bolt 61. The rear side 71 of the upper wedge 63 is formed to provide a planar surface 72 sloping downwardly and forwardly to a point 74 formed by the intersection of the sloping face 72 and the front vertical surface 76 of the cylinder, as appears most clearly in Figure 2. Since the upper wedge 63 is angularly movable about the axis of the cross bolt 61 and since the links 52 are not only angularly movable with respect to the lever arm 43 but are also translatable with respect thereto, within limits, the operator has available to him several variations in attitude as between the upper wedge 63 and the links 52, and has, as well, some freedom in longitudinal adjustment of the point 74 of the upper wedge, thus enabling him to insert the point of the wedge in the most convenient position in the cross chain connecting link and in this fashion pry apart the shanks and hooks even though those elements are in distorted attitude.

Opening of the cross chain connecting link is effected by co-operative wedging action exerted between the upper wedge 63 and a lower wedge 81, resembling, in many respects, the upper wedge 63 and comprising a short right circular cylinder 82 mounted conveniently in a nut 83 secured to the base plate 31 as by weldments 84. The right circular cylinder 82 includes a vertical cylindrical rear wall 86, or surface, and a forwardly and downwardly sloping or inclined face 87 forming at their intersection a point 88. The subtended angle of the upper and lower wedges are substantially equal, an angle of about 25° having been found to be very efficient.

In order to spread or move apart the closure legs or hooks 24 from the shanks 22 of the cross chain connecting link, it is only necessary for the operator to place the cross chain connecting link on the lower wedge 87 as illustrated most clearly in Figure 1, the hooks 24 being preferably placed near the front or forwardly inclined face 87 of the lower link and the shanks against the rear vertical face 86. The upper wedge 63 is thereupon adjusted by appropriate manipulation of the depending links 52 and by rocking the upper wedge into proper angular attitude with respect to the lower wedge so that the points 74 and 88 of the upper and lower wedges, respectively, are interposed between the hooks 24 and the shanks 22. Downward force is then applied on the lever handle 44 and as the upper wedge inclined face 72 slides downwardly along the face 87 of the lower wedge, the front wall 76 of the upper wedge and the rear wall 86 of the lower wedge are forcibly displaced longitudinally from each other, the purchase or leverage offered by the wedges serving to pry apart the hooks and shanks and in this fashion to open the cross chain connecting link to permit its easy withdrawal from the side chain link 14. The same procedure is followed on the corresponding chain members so as to remove all worn cross chain units.

Customarily, cross chains are sold as a unit for replacement purposes, each cross chain unit comprising a plurality of intermediate links to span the tire tread and having at each end a cross connecting chain link 18. The cross chains are sold or furnished to the user with the closure legs 24 in an open or spread apart condition, such as that indicated in full line in Figure 8 to permit insertion of the enlarged side chain link 14. In order to attach or connect the cross chain connecting link 18 securely to the corresponding side chain link 14, it is not only necessary that the closure legs 24 be hooked through or placed in engagement with the side chain link 14 as shown in Figure 8, but the closure legs 24 must then be bent or deformed inwardly toward the shanks 22 to receive a permanent set. The position of the hooks 24, indicated in outline in Figure 8, has been found satisfactory to prevent separation between the cross chain connecting link 18 and the side chain link 14, it not being necessary nor even desirable to effect complete closure.

The tire chain repairing device of my invention comprises mechanism for accomplishing this degree or extent of closure.

The lever arm and force transmitting elements of the link closing mechanism resemble in many respects the assemblage of parts used to open the links and, in fact, the base plate, linkages and levers may be used interchangeably. However, it is often found preferable for purposes of convenience in a garage, for example, or other establishment where extensive chain repair is to be effected, to locate the two mechanisms side by side to circumvent the necessity of interchanging the specific parts which come directly into contact with the chain links and which are different in structure.

Owing to the fact that new cross chain units serving as replacements are not deformed or twisted as a result of wear, as is the situation for the cross chains which are removed, it is not so necessary that freedom of motion be given to the closure elements which come in contact with the chains. In fact, it has been found that the closing or inward link bending operation is readily performed by the use of a lever arm 101, as shown in Figure 5, for example, which is securely mounted as by weldments 102 to a pair of vertically extending links 103 pivotally mounted at its lower end on a through bolt 104 disposed in a horizontal transverse direction in an aperture 105 in a vertical stud 106 secured as by weldments 107 to a base plate 108, and which, in turn, is mounted on a bench surface 109 as by fastenings 111. With the single point of pivot, or fulcrum, coinciding with the transverse longitudinal axis of the through bolt 104, the lever arm 101 swings vertically upwardly and downwardly substantially in the fashion indicated in Figure 8, the lever arm being lifted to permit insertion of the new cross connecting link 18 against a spacer block 115, the spacer block having a pair of rearwardly extending ears 116 adapted to fit around the front lower portion of the vertical stud 106. A tire chain repair shop would ordinarily utilize several different sizes of spacer blocks in order to accommodate the various different sizes of chain to be repaired; for example, one size of spacer block would be utilized to hold a passenger car tire chain in proper position below the lever, whereas another block shorter in longitudinal dimension would be used in connection with a truck type of chain link. In either event, an appropriate size of spacer block is used so as to bring the forward and top ends 118 of the hooks 24 of whichever chain is utilized substantially below a closing block 121, or shoe, the closing block 121 being mounted on the bottom side of the lever 101 as by weldments 122. The block 121 is substantially rectangular in cross section but is provided adjacent its lower end with a recessed or cut out portion having a downwardly and forwardly sloping face 123, the cut out portion being straddled by a pair of ears 124 serving to confine the link hooks 24 therebetween for the purpose of keeping the hooks 24 in the same general substantially parallel alignment as they are being deformed downwardly. The configuration of the closure block thus prevents the lateral spreading of the closure legs as is so often the case in link closing devices heretofore used and which not only weakens the link but renders later repair more difficult.

After the cross connecting link 18 is placed in abutment with the spacer block 115, in the manner indicated most clearly in Figure 8, downward force is exerted on the lever arm 101 either by use of the operator's muscular effort or by other mechanism such as mechanical force applicators, not shown. The downward force is transmitted to the block 121 which in turn transmits the downward bending force on the closure legs 124 and effects closing of the cross connecting link in the fashion shown in outline in Figure 8. It is to be noted that as downward bending proceeds, the inclined face 123 of the recessed portion at the lower end of the block approaches, more and more closely, the top surface of the hooks. When the hooks have been bent to the proper position, shown in outline in Figure 8, the two surfaces are in over-all contact. The abutment of the two parts can be felt by a trained operator and to such a person the feeling of contact serves as an indication that bending has reached the proper point.

It can therefore be seen that the tire chain repairing device of my invention provides a simple, inexpensive yet rapidly operable structure eminently suited for the replacement of tire chain cross links.

What is claimed is:

1. A tire chain repairing device comprising a base plate, a lever arm pivotally mounted on said plate, a pair of links cross connected by an upper bolt and a lower bolt, said pair of links beng slidably mounted on said lever arm and freely movable on said arm within the limits defined by the end walls of a recess in said arm, an upper wedge element pivotally mounted on said lower bolt, and a lower wedge element secured on said plate in co-operating relation with said upper wedge element.

2. The combination of claim 1 wherein the lower ends of said links are formed with a semi-circular configuration, and the upper end of said upper wedge element is provided with a pair of arcuate shoulders in mating relation with the arcuate lower ends of said links, said upper end of said upper wedge element also including a boss projecting upwardly between said links, said boss having a semi-circular upper margin bearing against said lever arm.

3. A tire chain repairing device comprising a base plate, a first pair of links pivotally mounted at one end on said base plate, a lever arm pivotally mounted on the other end of said first pair of links, said lever arm including a recess on the upper side of said arm, said recess being bounded at each end by a wall, a second pair of links straddling said lever arm, an upper cross bolt connecting the upper ends of said second pair of links and translatable between said walls of said recess, a lower cross bolt connecting the lower ends of said second pair, an upper wedge pivotally mounted on said lower bolt including an arcuate boss bearing against the lower side of said lever arm and a pair of arcuate shoulders in mating engagement with the lower ends of said second pair of links, and a lower wedge mounted on said plate below said upper wedge for sliding engagement therewith.

References Cited in the file of this patent

UNITED STATES PATENTS

| | | |
|---|---|---|
| 617,277 | Campbell | Jan. 3, 1899 |
| 1,486,484 | Fischer | Mar. 11, 1924 |
| 1,996,589 | Prescott | Apr. 2, 1935 |
| 2,523,979 | Weeks | Sept. 26, 1950 |